US012452469B2

(12) United States Patent
Wang et al.

(10) Patent No.: US 12,452,469 B2
(45) Date of Patent: Oct. 21, 2025

(54) DEVICES AND METHODS FOR SWITCHED DIGITAL VIDEO SYSTEMS

(71) Applicant: ARRIS Enterprises LLC, Suwanee, GA (US)

(72) Inventors: Wei Wang, Shenzhen (CN); Wenwu Wei, Shenzhen (CN); Zong Chang Guo, Shenzhen (CN); Chuankai Kou, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/584,259

(22) Filed: Jan. 25, 2022

(65) Prior Publication Data

US 2022/0239958 A1 Jul. 28, 2022

(30) Foreign Application Priority Data

Jan. 25, 2021 (CN) .......................... 202110097195.6

(51) Int. Cl.
*H04N 21/238* (2011.01)
*H04N 21/2343* (2011.01)
*H04N 21/236* (2011.01)
*H04N 21/2385* (2011.01)
*H04N 21/438* (2011.01)

(52) U.S. Cl.
CPC . *H04N 21/2385* (2013.01); *H04N 21/234309* (2013.01); *H04N 21/23617* (2013.01); *H04N 21/4383* (2013.01)

(58) Field of Classification Search
None
See application file for complete search history.

(56) References Cited

U.S. PATENT DOCUMENTS

| 6,225,993 | B1 * | 5/2001 | Lindblad | H04N 7/17318 |
| | | | | 348/E7.071 |
| 8,365,213 | B1 * | 1/2013 | Orlowski | G06Q 30/0251 |
| | | | | 725/15 |
| 9,571,896 | B2 * | 2/2017 | Dang | H04N 21/2407 |
| 2002/0191712 | A1 * | 12/2002 | Gaddam | H04L 27/02 |
| | | | | 375/301 |

(Continued)

*Primary Examiner* — Mushfikh I Alam
(74) *Attorney, Agent, or Firm* — Chernoff, Vilhauer, McClung & Stenzel, LLP

(57) ABSTRACT

The present disclosure relates to devices and methods for switched digital video (SDV) systems. A first device used in an SDV system is provided, which can perform the following operations: generating a list of opened channels, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier; and sending the list of opened channels to a second device, so that for each data field, the encoding format corresponding to the encoding format identifier of the data field is compared with the decoding capability of the second device, and the data field is retained in response to the encoding format matching the decoding capability, while the data field is discarded in response to the encoding format not matching the decoding capability.

17 Claims, 6 Drawing Sheets

(56) References Cited

U.S. PATENT DOCUMENTS

| | | | | |
|---|---|---|---|---|
| 2004/0236956 | A1* | 11/2004 | Shen | H04N 21/23476 |
| | | | | 348/E7.071 |
| 2009/0031341 | A1* | 1/2009 | Schlack | H04N 21/437 |
| | | | | 725/38 |
| 2009/0222872 | A1* | 9/2009 | Schlack | H04N 7/173 |
| | | | | 725/114 |
| 2010/0162321 | A1* | 6/2010 | Bradley | H04N 21/2385 |
| | | | | 725/56 |
| 2011/0126104 | A1* | 5/2011 | Woods | H04N 21/482 |
| | | | | 725/86 |
| 2011/0296399 | A1* | 12/2011 | Tugnawat | H04W 8/183 |
| | | | | 717/174 |
| 2012/0011375 | A1* | 1/2012 | Widergren | G11B 20/005 |
| | | | | 713/193 |
| 2012/0023535 | A1* | 1/2012 | Brooks | H04N 21/64322 |
| | | | | 725/110 |
| 2013/0163430 | A1* | 6/2013 | Gell | H04N 21/6131 |
| | | | | 370/235 |
| 2014/0157342 | A1* | 6/2014 | Yahata | H04N 21/44016 |
| | | | | 725/116 |
| 2015/0023243 | A1* | 1/2015 | Liu | H04L 12/189 |
| | | | | 370/312 |
| 2017/0311159 | A1* | 10/2017 | Tulliano | H04M 1/72415 |
| 2019/0215569 | A1* | 7/2019 | Liu | H04N 21/4627 |
| 2020/0145710 | A1* | 5/2020 | Poli | H04N 21/2221 |
| 2021/0149881 | A1* | 5/2021 | Mustafa | G06F 16/2379 |

* cited by examiner

DEVICES AND METHODS FOR SWITCHED DIGITAL VIDEO SYSTEMS

CROSS-REFERENCE TO RELATED APPLICATIONS

This application claims the benefit of priority under 35 U.S.C. § 119 (a) to Chinese national application CN 202110097195.6, filed on Jan. 26, 2021.

BACKGROUND OF THE INVENTION

Technical Field

This application claims priority of China Patent Application Number 202110097195.6, filed Jan. 25, 2021.

The present disclosure relates to the technical field of digital television, more specifically to devices and methods for switched digital video (SDV) systems.

Background Art

With increasing demand from users for high-definition TV (HDTV) channels, traditional cable TV (CATV) delivery systems face the problem of bandwidth depletion because in traditional CATV systems, all channels are combined into one data stream and transmitted to users. Although many channels are not watched, they also occupy a large amount of transmission bandwidth. In order to meet the needs of users and solve the bandwidth problem of such traditional CATV systems, switched digital video (SDV) systems were developed.

Unlike traditional CATV systems, a SDV system only broadcasts data streams of popular content that large numbers of users may be interested in, or be expected to watch, while narrowcasting other channels only when demanded by a particular user. Therefore, the SDV system may effectively save overall bandwidth in the system by providing only the most popular channels to all viewers, and providing other available content on demand. As an example, the SDV system may broadcast a subset of the available channels to users for viewing per service group. For example, a service group may include users located in a certain geographical area, and their interests in the channels may have certain similarities and degree of coincidence.

A data stream carrying a number of channels may be encoded using the MPEG (Moving Picture Experts Group) coding format, and decoded by the corresponding MPEG decoding format in a set-top box (STB) in a subscriber's premises. In the previous SDV systems, the MPEG-2 encoding format was usually used. According to some industry organization standards, the MPEG-2 transmission bandwidth of a standard definition television (SDTV) channel is 3.75 Mbps, while that of an HDTV channel ranges from 12 Mbps to 19.2 Mbps. With the development of coding technology, MPEG-4 coding format has been applied to the SDV systems in recent years. MPEG-4 encoded video could use as little as about 70 to 80 percent of the bandwidth of MPEG-2 encoded video to achieve almost the same video quality. At present, a switched digital video technology has been developed to transmit the data stream of corresponding encoding format to users according to the decoding capability of STBs.

The existence of multiple MPEG coding formats makes it necessary to adapt and improve various services in the SDV system.

SUMMARY

A service is provided in an SDV system to provide users with a list of opened channels. In this scenario, it is desirable to enable electronic devices to effectively mark and identify data streams with different encoding formats, so as to improve the accuracy of the service and user satisfaction.

According to a first aspect of the present disclosure, a first device for use in a switched digital video (SDV) system is provided. The first device comprises a processor and a memory, wherein the memory is coupled to the processor and includes executable instructions stored on the processor, which when executed by the processor, causes the first device to perform the following operations: generating a list of opened channels, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier; and sending the list of opened channels to a second device, so that for each data field, the encoding format corresponding to the encoding format identifier of the data field is compared with the decoding capability of the second device, and the data field is retained in response to the encoding format matching the decoding capability, while the data field is discarded in response to the encoding format not matching the decoding capability.

In some embodiments, for the first device described above, when executed by the processor, further cause the first device to perform the following operation: including the list of opened channels in an active lineup (ACL) structure in a Mini Carousel Protocol (MCP) message.

In some embodiments, for the first device described above, when executed by the processor, further cause the first device to perform the following operation: using reserved bits in the ACL structure in the MCP message as the encoding format identifier.

In some embodiments, for the first device described above, when executed by the processor, further cause the first device to perform the following operation: including frequency point information in each data field of the at least one data field, wherein the frequency point information is associated with the channel and the encoding format corresponding to the data field.

In some embodiments, for the first device described above, the one or more encoding formats include MPEG-2 encoding format and/or MPEG-4 encoding format.

In some embodiments, the first device includes an SDV server, and the second device includes an STB.

According to a second aspect of the present disclosure, a second device for use in a switched digital video (SDV) system is provided. The second device comprises a processor and a memory, wherein the memory is coupled to the processor and includes executable instructions stored thereon, which, when executed by the processor, cause the second device to perform the following operations: receiving a list of opened channels from the first device, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier; and comparing, for each data field of the at least one data field, the encoding format corresponding to the encoding format identifier of the data field with the decoding capability of the second device, and retaining the data field in response to the encoding format matching the decoding capability, while discarding the data field in response to the encoding format that not matching the decoding capability.

In some embodiments, for the second device described above, the list of opened channels is included in an active lineup (ACL) structure in a Mini Carousel Protocol (MCP) message. In addition, the reserved bits in the ACL structure in the MCP message are used as the encoding format identifier.

In some embodiments, for the second device described above, each data field of the at least one data field includes frequency point information, and the frequency point information is associated with the channel and encoding format corresponding to the data field.

In some embodiments, for the second device mentioned above, the one or more encoding formats include MPEG-2 encoding format and/or MPEG-4 encoding format.

In some embodiments, the first device includes an SDV server, and the second device includes an STB.

Corresponding to the first aspect of the present disclosure, the present disclosure also provides a method for the first device in a switched digital video (SDV) system, comprising: generating a list of opened channels, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier; and sending the list of opened channels to a second device, so that for each data field, the encoding format corresponding to the encoding format identifier of the data field is compared with the decoding capability of the second device, and the data field is retained in response to the encoding format matching the decoding capability, while the data field is discarded in response to the encoding format not matching the decoding capability.

In some embodiments, said method further includes: including the list of opened channels in an active lineup (ACL) structure in a Mini Carousel Protocol (MCP) message.

In some embodiments, said method further includes: using reserved bits in the ACL structure in the MCP message as the encoding format identifier.

In some embodiments, said method further includes: including frequency point information in each data field of the at least one data field, wherein the frequency point information is associated with the channel and the encoding format corresponding to the data field.

In some embodiments, in the above method, the one or more encoding formats include MPEG-2 encoding format and/or MPEG-4 encoding format.

In some embodiments, in the above method, the first device includes an SDV server, and the second device includes an STB.

Corresponding to the second aspect of the present disclosure, the present disclosure also provides a method for the second device in a switched digital video (SDV) system, the method comprising: receiving a list of opened channels from the first device, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats of the channel identified by the channel identifier; and comparing, for each data field, the encoding format corresponding to the encoding format identifier of the data field with the decoding capability of the second device, and retaining the data field in response to the encoding format matching the decoding capability, while discarding the data field in response to the encoding format not matching the decoding capability.

In some embodiments, in the above method, the list of opened channels is included in an active lineup (ACL) structure in a Mini Carousel Protocol (MCP) message. In addition, the reserved bits in the ACL structure in the MCP message are used as the encoding format identifier.

In some embodiments, in the method described above, each data field of the at least one data field includes frequency point information, and the frequency point information is associated with the channel and encoding format corresponding to the data field.

In some embodiments, in the above method, the one or more encoding formats include MPEG-2 encoding format and/or MPEG-4 encoding format.

In some embodiments, in the above method, the first device includes an SDV server, and the second device includes a STB.

According to a third aspect of the present disclosure, there is provided a non-transient computer-readable storage medium comprising executable instructions stored thereon, that, when executed by one or more processors, cause one or more processors to execute the method according to the present disclosure According to a fourth aspect of the present disclosure, there is provided a system for switched digital video (SDV), the system comprising a first device and a second device, each having a processor and a memory coupled to the processor and including executable instructions stored thereon, which, when executed by the processor, causes the first device and the second device to perform the following operations: the first device generating a list of opened channels, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier; the first device sending the list of opened channels to a second device; the second device receiving the list of opened channels from the first device; and the second device comparing, for each data field, the encoding format corresponding to the encoding format identifier of the data field with the decoding capability of the second device, and retaining the data field in response to the encoding format matching the decoding capability, while discarding the data field in response to the encoding format not matching the decoding capability.

BRIEF DESCRIPTION OF THE DRAWINGS

For a better understanding of the present disclosure and to show how to implement the present disclosure, examples are herein described with reference to the attached drawings, wherein.

It should be noted that throughout the drawings, similar reference numerals and signs refer to corresponding parts. In addition, multiple instances of the same part are designated by a common prefix separated from the instance number by a dash.

DETAILED DESCRIPTION

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is limited by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
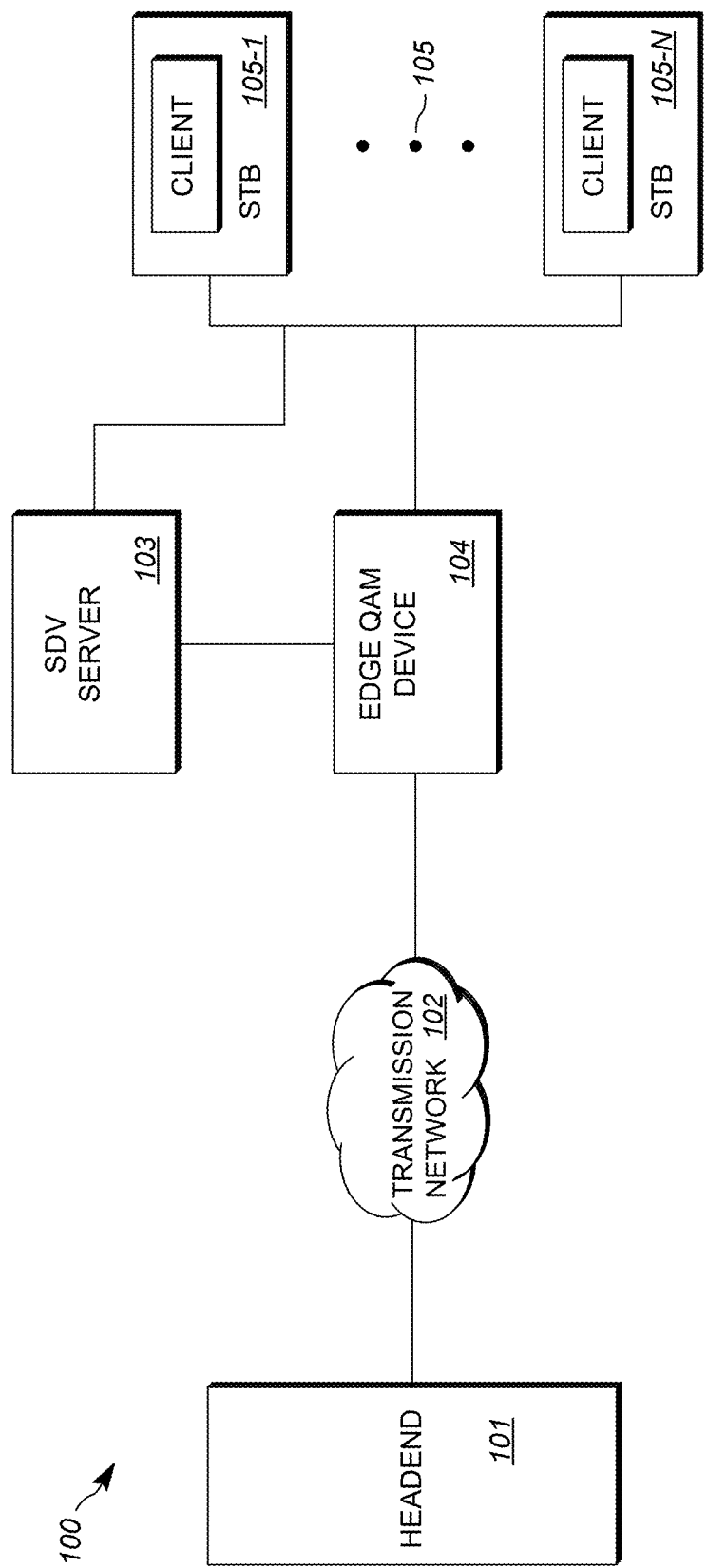
FIG. 1 is a schematic diagram showing a switched digital video (SDV) system according to an embodiment of the present disclosure.

FIG. 1 is a schematic diagram showing a switched digital video (SDV) system 100 according to an embodiment of the present disclosure. As shown in FIG. 1, an SDV system 100 may comprise a headend 101, a network 102, an SDV server 103 (also referred to as the first device in this disclosure), edge QAM device 104, and an STB 105 (also referred to as the second device in this disclosure), where STBs 105 are STB 105-1 to STB 105-N.

In the SDV system 100, the headend 101 is a part of a content source data stream (such as video stream of a TV channel) fed into the system, and the headend 101 includes devices directly connected to a content provider (e. g., a cable television company). As an example, the headend 101 may include an MPEG encoder that converts an original digital or analog signal into an MPEG encoding format. The headend 101 may also include a bulk encryptor, an Internet server, an application server (such as a session and resource manager (SRM)) and the like.

The headend 101 sends a signal to the transmission network 102 after converting the content source data stream into an MPEG encoding format. The transmission network 102 includes nodes, routers, etc., and is used to route content sources to an access system with SDV server 103 as the core. As an example, the SDV server 103 transmits messages with STB 105 over Ethernet based on IP protocol. The SDV server 103 runs software designed to interpret channel requests, so the SDV server 103 can track channel requests sent by users through STB 105 (with clients running on it). After receiving a channel request from the STB 105, the SDV server 103 communicates with the edge QAM device 104 to meet the needs of the user.

In a specific embodiment, after a user sends a channel request (e.g., intending to watch a certain channel) to the SDV server through STB 105, the SDV server 103 first determines whether the channel requested by the user has been opened previously. If the channel has not been opened previously, the SDV server 103 will assist in opening the channel according to the following process: The SDV server 103 sends a request for opening the channel to the edge QAM device 104, so that the edge QAM device 104 uses its open service to open the channel, and sends an acknowledgement (e.g., ACK) message to the SDV server 103 after success; after receiving the confirmation message from the edge QAM device, the SDV server 103 informs the STB 105 that the channel has been opened and sends relevant information (e.g., frequency point information, etc.) of the channel to STB 105, so that STB 105 can tune to the corresponding frequency point to view the requested channel. The process of opening the channel involves a plurality of operations, so it takes a long time and the user has to wait for a long time, which easily leads to poor user experience. On the contrary, if the SDV server 103 determines that the channel requested by the user has been turned on previously, the communication interaction process between the SDV server 103 and the edge QAM device 104 in the above process can be omitted, so that the user can watch the requested channel almost without waiting, which greatly improves the user's satisfaction. Therefore, in the SDV system, the SDV server 103 can maintain the list of opened channels, and continuously provide such list of opened channels to the STB 105, thus making it convenient for the user to know the status of different channels and select the viewing channel pertinently.

As mentioned above, the SDV system may provide a specific number of channels to users as per service group for viewing. Generally speaking, the opened channels can include broadcast channels and dynamic channels. The broadcast channels are being kept in an open status, which mainly include the popular program channels within the scope of service group or a larger scope. The broadcast channels can be pre-configured by content source providers. The dynamic channels mainly include the program channels that any user in the service group is interested in and has watched (i.e., opened). The dynamic channels can be updated periodically according to audience selection and feedback.

It should be understood that the schematic diagram of SDV system is shown only in the way of example in FIG. 1. In practice, one or a plurality of devices can be added or reduced as required. It should also be understood that the data streams of channels described in the present disclosure may include, but are not limited to, audio stream, video stream, multimedia file and other data streams of channels.

Figure 2:
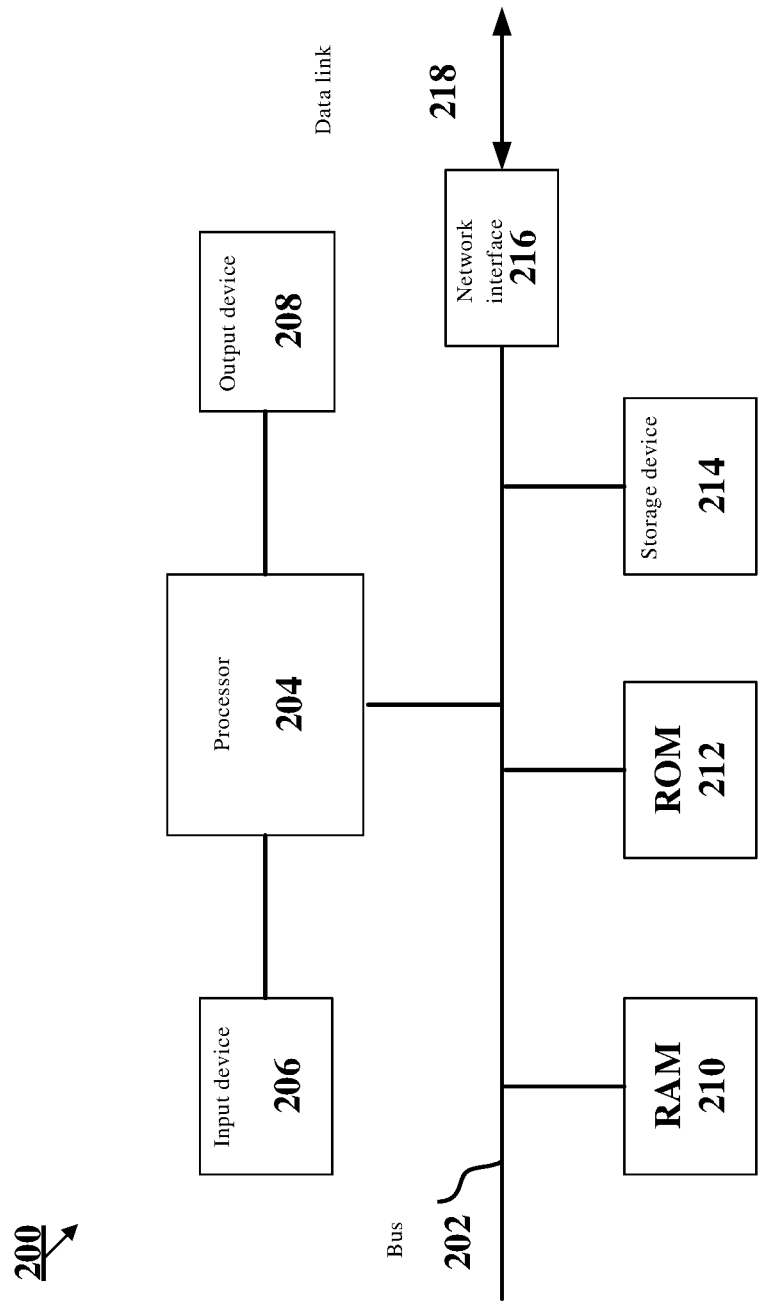
FIG. 2 is a schematic diagram showing an electronic device according to an embodiment of the present disclosure.

FIG. 2 is a block diagram showing an electronic device 200 (e.g., the first or second device described above) according to an embodiment of the present disclosure. The electronic device 200 may be used to implement each embodiment of the method according to the present disclosure described in the present specification.

As shown in FIG. 2, the electronic device 200 may include one or a plurality of components that may be connected or communicated with the bus 202 via one or a plurality of interfaces. The bus 202 may include electrical, optical, and/or electro-optical connections that may be used to convey commands, data, etc. Although only one bus 202 is shown for clarity, different embodiments may include different numbers or configurations of electrical, optical, and/or electro-optical connections. As an example, the bus 202 may include, but is not limited to, industry standard architecture (ISA) bus, micro channel architecture (MCA) bus, enhanced ISA (EISA) bus, VESA local bus, peripheral component interconnection (PCI) bus, etc.

The electronic device 200 may include, for example, one or a plurality of processors 204, one or a plurality of input devices 206, and one or a plurality of output devices 208. One or a plurality of processors 204 include one or a plurality of devices configured to perform computing operations. For example, one or a plurality of processors 204 may include, but are not limited to, one or a plurality of general-purpose or special purpose processors, such as microprocessors, application specific integrated circuits (ASICs), microcontrollers, programmable logic devices, graphics processor units (GPUs), and/or digital signal processors (DSPS). The input device 206 may be any type of input device capable of inputting information to an electronic device, and may include, but is not limited to, a mouse, a keyboard, a touch screen, a microphone, and/or a remote controller. The output device 208 may be any type of device capable of presenting information, and may include, but is not limited to, a display, a speaker, a video/audio output terminal, a vibrator, and/or a printer.

The electronic device 200 may also include or be connected to a non-transient storage device 214, which may be any non-transient storage device capable of data storage, and may include, but is not limited to, a disk drive, an optical storage device, a solid-state memory, a floppy disk, a flexible disk, a hard disk, a magnetic tape or any other magnetic medium, a compressed disk or any other optical medium, a cache memory and/or any other memory chip or module, and/or any other medium from which a computer can read data, instructions and/or codes. In addition, instructions stored in the various modules of the memory device 214 can be implemented by the following: advanced programming languages, object-oriented programming languages and/or assembly or machine languages. Besides, the programming language may be compiled or interpreted, e.g., configurable or configured (used interchangeably in the present disclosure), so as to be executed by the processor 204. The electronic device 200 may also an include random access memory (RAM) 210 and a read-only memory (ROM) 212. The ROM 212 may store programs, utilities, or processes to be executed in a nonvolatile manner. The RAM 210 may provide volatile data storage and store instructions related to the operation of the electronic device 200. The electronic device 200 may also include a network/bus interface 216 coupled to the data link 218. The network/bus interface 216 may be any kind of device or system capable of enabling communication with external devices and/or networks, and may include, but is not limited to, modems, network cards, infrared communication devices, wireless communication devices, and/or chipsets.

In some embodiments, the storage device 214 is coupled to one or a plurality of high-capacity mass storage devices (not shown). For example, the storage device 214 may be coupled to a magnetic or an optical driver, a solid-state driver, or another type of mass storage device. In these embodiments, the electronic device 200 may use the storage device 214 as a fast-access storage of frequently used data, whereas the mass storage device is used for storing infrequently used data.

The electronic device 200 may be (or may be included in) any electronic device having at least one network interface. For example, the electronic device 200 may be (or may be included in): a desktop computer, a laptop computer, a sub-notebook/netbook, a server, a computer, a mainframe computer, a cloud-based computer, a tablet computer, a smart phone, an STB, a consumer electronic device, a portable computing device, a controller, a communication device, a test device, and/or other electronic devices.

Although specific components are used to describe the electronic device 200, in an alternative embodiment, there may be different components in the electronic device 200. For example, the electronic device 200 may include one or a plurality of additional processors, additional storage devices, additional input devices, and additional output devices.

In addition, any combination of analog and/or digital circuits may be used to implement the circuits and components in the electronic device 200, including: bipolar, PMOS and/or NMOS gates or transistors. In addition, the signals in these embodiments may include digital signals with approximate discrete values and/or analog signals with continuous values. In addition, the components and circuits may be single-ended or differential, and the power supplies may be unipolar or bipolar.

As mentioned above, the SDV server can provide the STB with a list of opened channels. In the previous SDV systems, there was usually only one encoding format (for example, MPEG-2 encoding format) for the data stream of a channel, so the channel identifier (sometimes referred to as the "source identifier") can be used to uniquely identify the data stream of an opened channel. However, with the development of SDV systems and coding technology, a channel can include data streams of multiple encoding formats (for example, MPEG-4 encoding format and MPEG-2 encoding format). In this case, using only the channel identifier to mark the specific data stream that has been opened may lead to decoding errors and service interruption.

Specifically, in one embodiment, a data stream of MPEG-4 encoding format for one channel has been opened. The SDV server sends a list of opened channels including this opened channel to the STB. Since the data stream is only marked by the channel identifier, the STB simply considers that the channel has been opened and can be viewed quickly. However, if the STB only has MPEG-2 decoding capability, decoding errors will occur when directly tuning to the frequency point of the channel, resulting in service interruption. In another embodiment, both MPEG-2 and MPEG-4 encoded data streams of one channel have been opened. The SDV server sends a list of opened channels including this opened channel to the STB. Because the data stream is marked only by the channel identifier, the SDV server does not know which encoding format related data stream information should be provided (e.g., frequency point information, which may be different for the data streams involving different encoding formats for the same channel). Even if the SDV server randomly selects the data stream information of one of the encoding formats, decoding errors and service interruption may occur if the STB does not have the corresponding decoding capability.

In view of the above problems, the present disclosure proposes the following method to enable the devices of switched digital video (SDV) systems to uniquely identify the data streams of different encoding formats of the same channels, so as to ensure that the user end STB can correctly identify the data stream in the encoding format corresponding to its own decoding capability and retain the relevant information after receiving the list of opened channels.

Figure 3A:
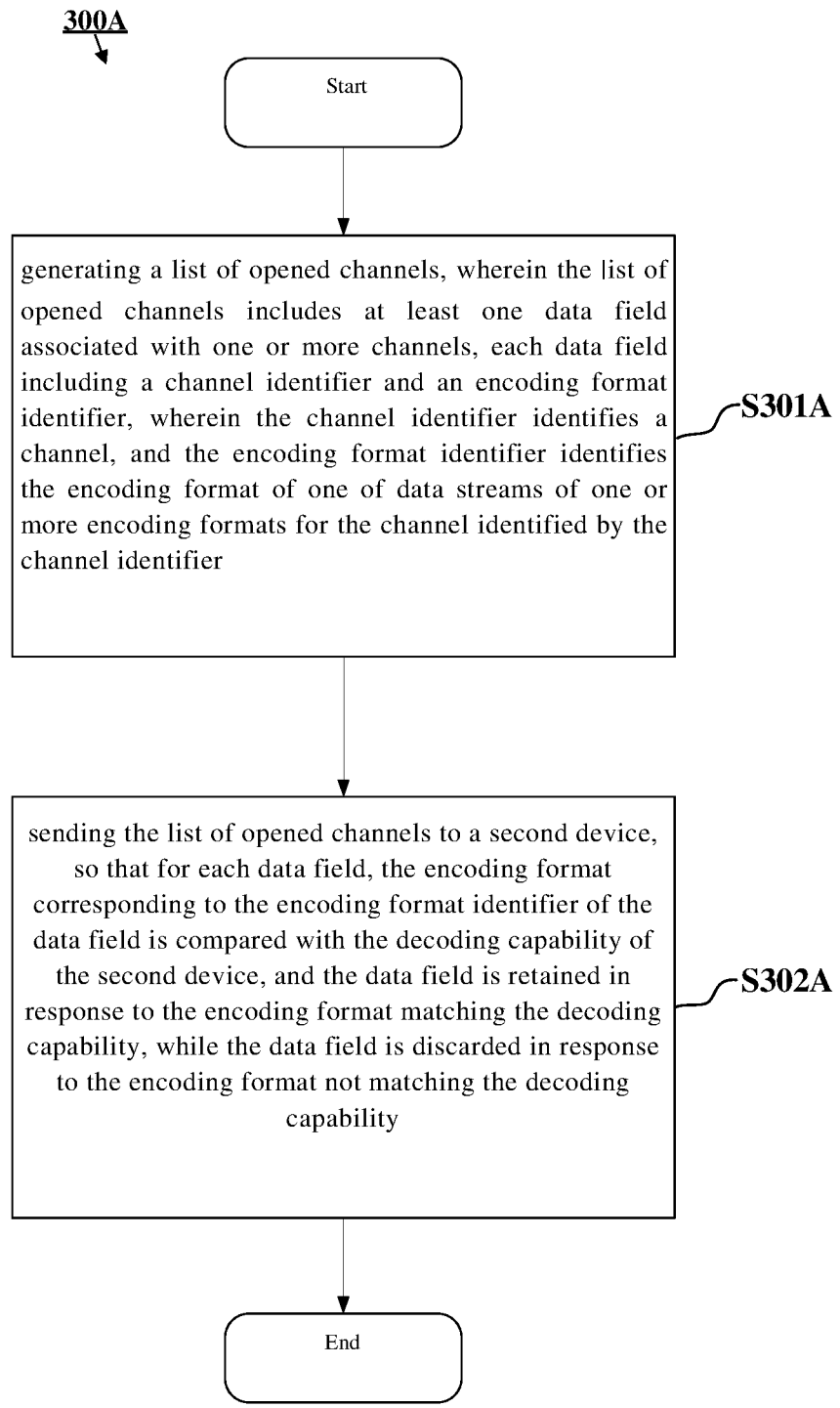
FIGS. 3A and 3B show the flow charts of methods for SDV systems according to embodiments of the present disclosure.
Figure 3B:
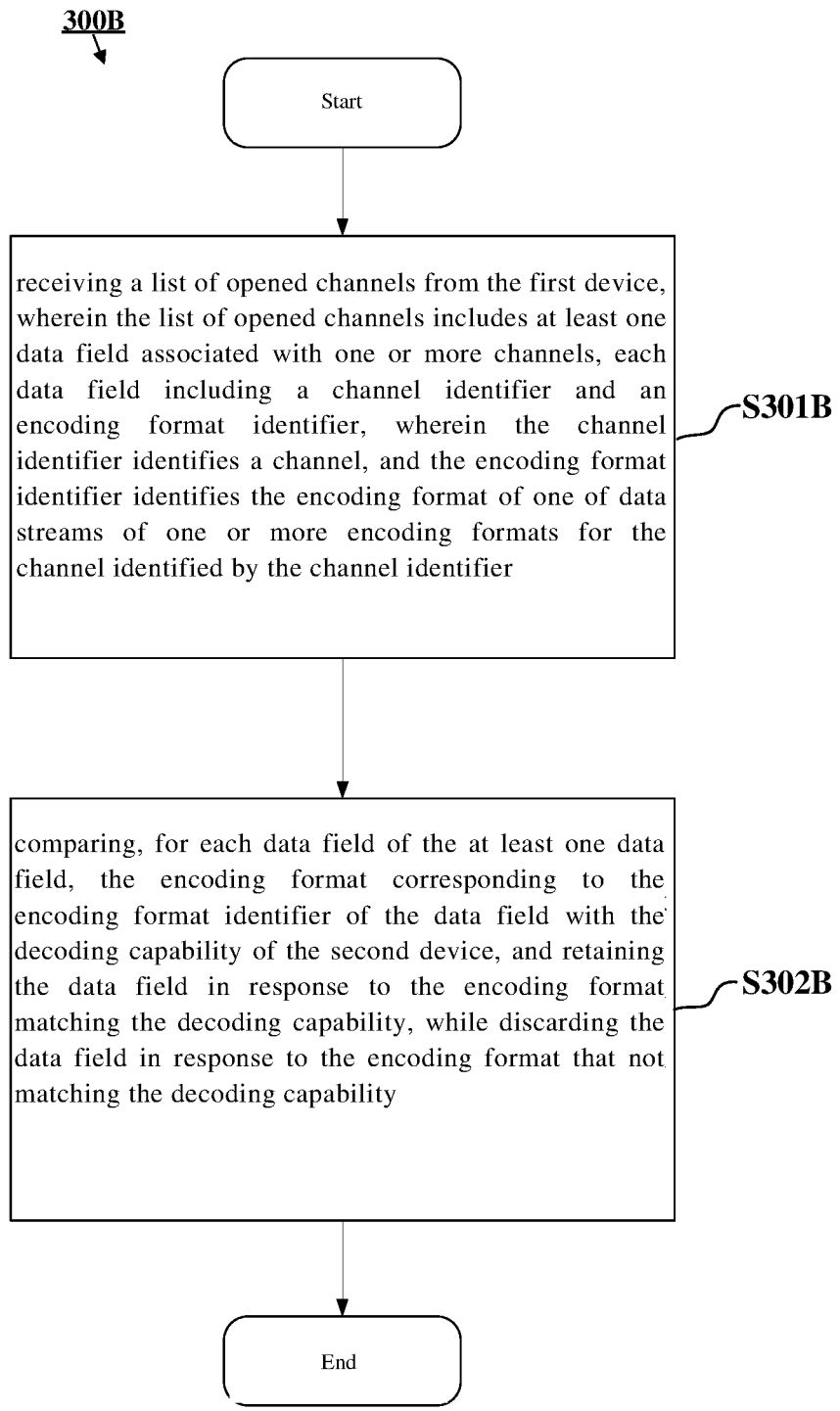

FIGS. 3A and 3B show flow charts of the method for SDV systems according to an embodiment of the present disclosure. Specifically, FIG. 3A shows a flowchart 300A of a method for a first device (e.g., an SDV server) in an SDV system; FIG. 3B shows a flowchart 300B of a method for a second device (e.g., an STB) in an SDV system.

According to 300A, in the step S301A, the first device generates a list of opened channels, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier. In the step S302A, the first device sends the list of opened channels to a second device, so that for each data field, the encoding format corresponding to the encoding format identifier of the data field is compared with the decoding capability of the second device, and the data field is retained in response to the encoding format matching the decoding capability, while the data field is discarded in response to the encoding format not matching the decoding capability.

Corresponding to 300A, according to 300B, in the step 301B, the second device receives a list of opened channels from the first device, wherein the list of opened channels includes at least one data field associated with one or more channels, each data field including a channel identifier and an encoding format identifier, wherein the channel identifier identifies a channel, and the encoding format identifier identifies the encoding format of one of data streams of one or more encoding formats for the channel identified by the channel identifier. In the step S302B, the second device compares, for each data field of the at least one data field, the encoding format corresponding to the encoding format identifier of the data field with the decoding capability of the second device, and retaining the data field in response to the encoding format matching the decoding capability, while discarding the data field in response to the encoding format that not matching the decoding capability.

According to the method described in the present disclosure, the channel identifier and the encoding format identifier are used to jointly and uniquely identify the data stream of one encoding format of each opened channel, so that the STB can retain the data field in response to the data stream of the encoding format in the list of opened channels that matches its own decoding capability. Thus, the STB presents a list of opened channels that match its decoding capability to the user, so that the user can select and watch channels according to his needs.

The devices and method for the SDV systems proposed in the present disclosure will be further described in detail below in combination with FIGS. 4 and 5.

In the SDV system, the list of opened channels transmitted between the SDV server and the STB can be included in the active lineup (ACL) structure in the Mini Carousel Protocol (MCP) message. FIG. 4 shows a schematic diagram of the structure of an MCP message according to an embodiment of the present disclosure. MCP messages are constructed and generated by the SDV server based on the channel information maintained by the SDV server.

Figure 4:
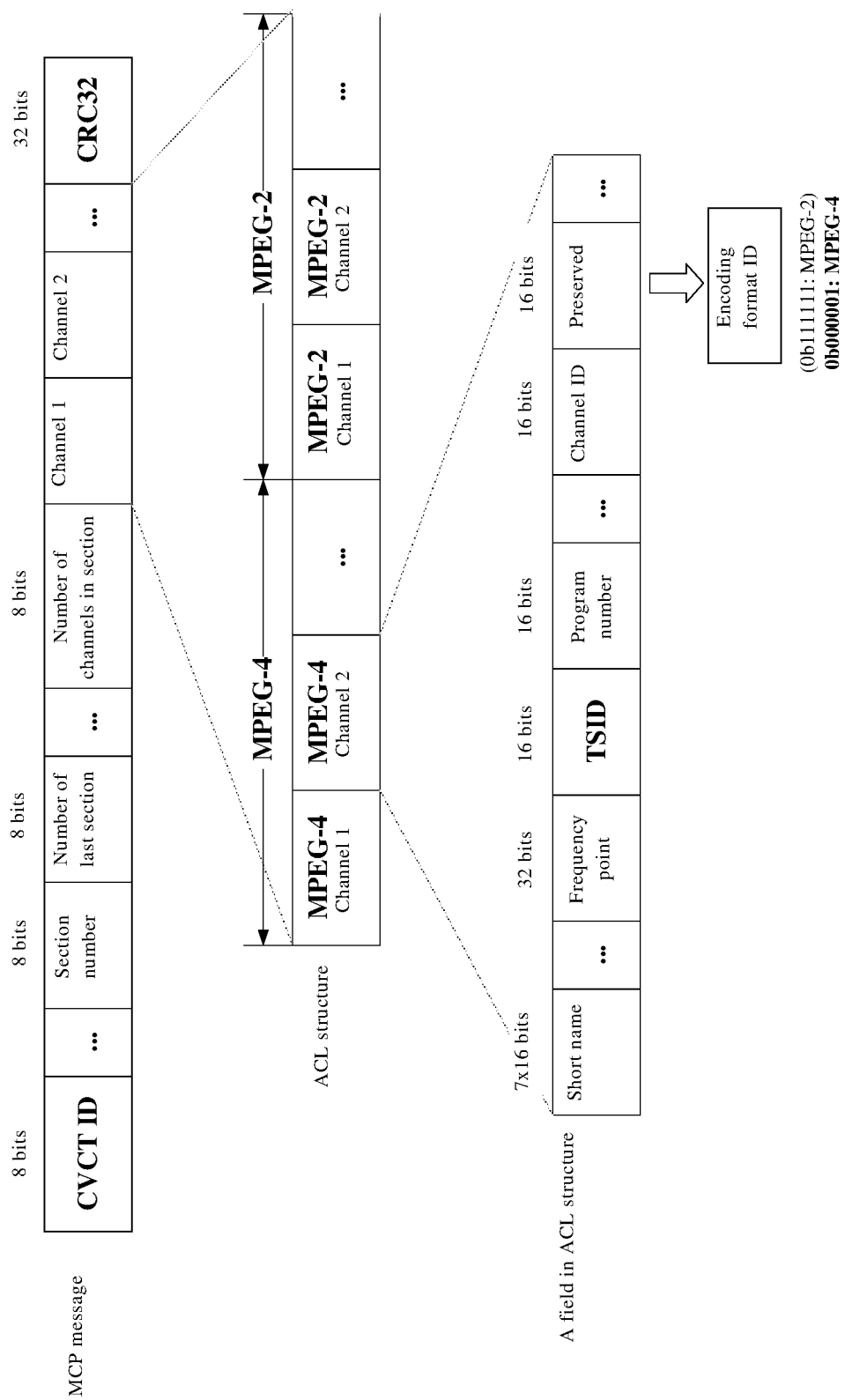
FIG. 4 is a schematic diagram showing the structure of a Mini Carousel Protocol (MCP) message according to an embodiment of the present disclosure.

As shown in FIG. 4, the MCP message includes CVCT (cable virtual channel table) ID, section number (one section can include a plurality of channels), ACL structure, CRC check code, etc. The ACL structure includes the previously opened channel list, wherein the opened channel list includes one or a plurality of data fields about one or a plurality of channels, and each data field corresponds to the data stream of an encoding format of an opened channel. Further, each data field includes specific information of the data stream of an encoding format of the corresponding channel, such as channel ID (interchangeably used with "channel identifier" herein), encoding format ID (interchangeably used with "coding format identifier" herein), frequency point information, etc. The frequency point information in the data field is associated with the channel and encoding format corresponding to the data field, and the frequency point information corresponding to the data streams of different encoding formats of the same channel can be different.

According to the present disclosure, the channel ID and the encoding format ID jointly and uniquely identify the data stream of an encoding format for each channel that has been opened. As shown in FIG. 4, the reserved bits (6 bits) in the ACL structure can be used as the encoding format identifier. As an example, the reserved bits can be set to 0b111111 to indicate that the encoding format of the data stream is MPEG-2 encoding format, and the reserved bits can also be set to 0b000001 to indicate that the encoding format of the data stream is MPEG-4 encoding format.

It should be understood that, for the sake of clarity, this specification mainly describes the MPEG encoding format, and other coding formats well known to those skilled in the art are also applicable to the present disclosure. It should also be understood that a part of the reserved bits in the ACL structure of the MCP message can be used as the encoding format identifier, or other bits in the ACL structure or special bits can be added as the encoding format identifier according to the actual situation.

After receiving an MCP message from the SDV server, the STB extracts the specific data field information in the ACL structure, and compares its decoding capability with the encoding format corresponding to the encoding format identifier of each data field (i.e., each data stream) in ACL structure. The STB will keep the data field in response to the encoding format that matches its decoding capability; otherwise, STB will discard the data field in response to the encoding format that does not match its decoding capability. As an example, in the case where the STB supports MPEG-4 decoding format and receives an open channel list including two data fields about channel 1 (data streams corresponding to the MPEG-2 encoding format and the MPEG-4 encoding format of channel 1 respectively), the STB may retain only the data field of data stream corresponding to MPEG-4 encoding format of channel 1, and discard the data field of the data stream corresponding to the MPEG-2 encoding format of channel 1. Accordingly, the STB can tune to the frequency point of MPEG-4 encoded data stream of channel 1 through the frequency point information in the reserved data field, so as to realize fast viewing of channel 1.

It should be understood that if a channel contains only the data stream of one encoding format and the channel has been opened previously, or if only the data stream of one encoding format has been opened previously, then the ACL structure only includes one data field about the channel. As an example, channel 3 includes two data streams of MPEG-2 encoding format and MPEG-4 encoding format, but only the data stream of MPEG-4 encoding format has been opened previously. Correspondingly, the ACL structure only includes the [channel 3 MPEG-4] data field, and does not include the [channel 3 MPEG-2] data field.

It should be noted that although an STB with MPEG-4 decoding capability can also decode the stream of MPEG-2 encoding format, the STB uses MPEG-4 decoding format to decode data streams by default. Therefore, the STB with MPEG-4 decoding capability may think its own decoding capability does not match MPEG-2 encoding format by default. In this regard, in an alternative or additional embodiment, in the case where a channel only includes a data stream in the MPEG-2 encoding format and the data stream has been opened previously, if it is hoped that the STBs with the MPEG-2 decoding capability and the MPEG-4 decoding capability can all identify that the data stream has been opened, then in the ACL structure of MCP message, the information of the data stream other than the encoding format can be included in the MPEG-2 data field and the MPEG-4 data field corresponding to the channel, respectively. In other words, the above two data fields corresponding to the channel have the same information (such as frequency point information, etc.) except that the encoding format identifiers are different. Therefore, an STB with two decoding capabilities can tune the same frequency point and watch the channel quickly, which further improves the flexibility of the system.

After the STB processes the data fields in the received ACL structure, it can present the current overall channel list (including the opened channel list) to the user through, for example, a display. FIG. 5 is a schematic diagram showing a channel list according to an example of the present disclosure. Specifically, 500A and 500B in FIG. 5 respectively show the processing of the STBs with different decoding capabilities after receiving the same MCP message and the content displaying by the corresponding displays.

Figure 5:
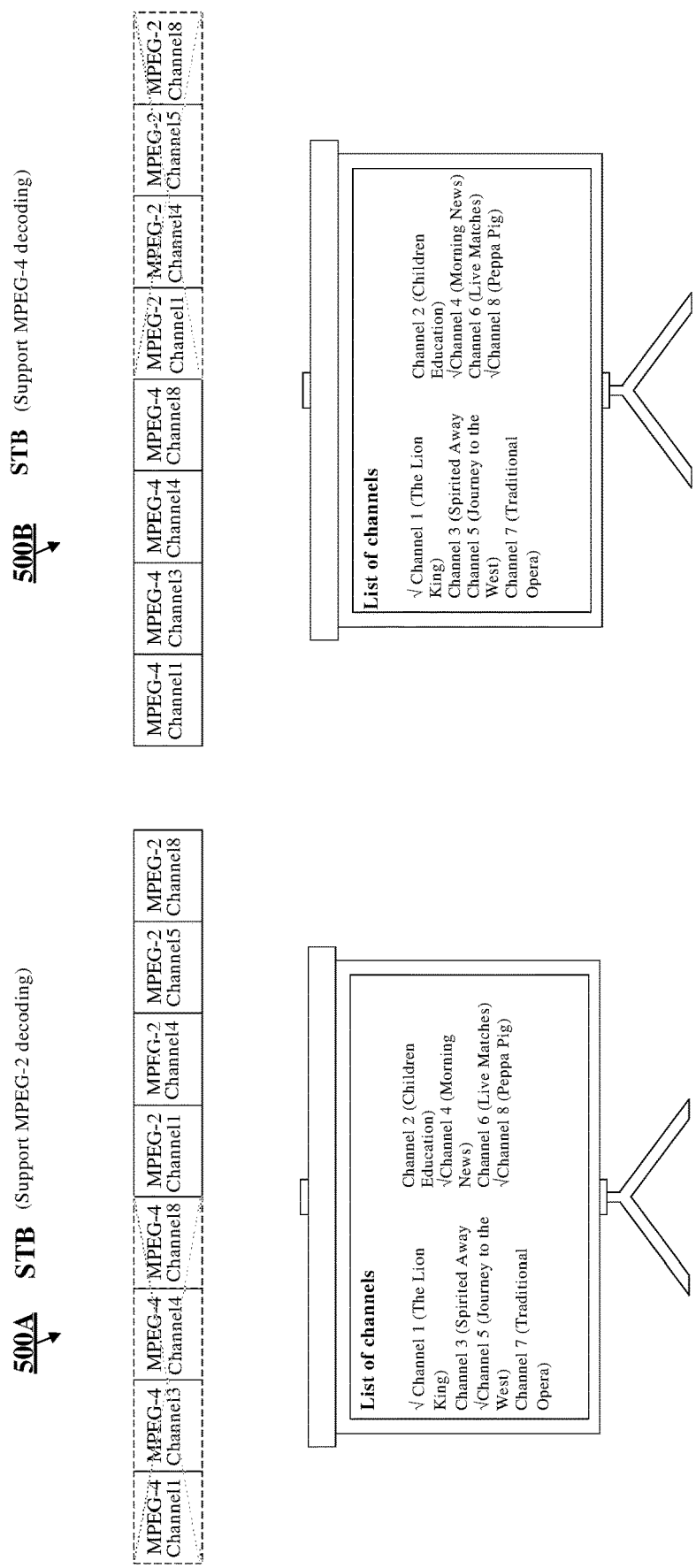
FIG. 5 is a schematic diagram showing a channel list according to an example of the present disclosure.

As shown in FIG. 5, as an example, there are eight channels (i.e., channel 1 to channel 8) in the SDV system for users to choose for watching. The data streams of channel 1, channel 4 and channel 8 (including MPEG-2 and MPEG4 encoding formats) have been previously opened, the data stream of MPEG-4 encoding format of channel 3 has been previously opened, and the data stream of MPEG-2 encoding format of channel 5 has been previously opened.

According to the device and method provided in the present disclosure, the SDV server generates an ACL structure including eight data fields corresponding to the eight data streams that have been previously opened, includes the ACL structure in an MCP message and sends it to the STB. Each data field includes a channel identifier and an encoding format identifier to uniquely identify the opened data stream corresponding to the data field. In 500A, the STB retains all data fields with an MPEG-2 encoding format identifier in the ACL structure matching its decoding capability (MPEG-2), and discards all data fields with an MPEG-4 encoding format identifier (discarded data fields are indicated by "x" in FIG. 5). Similarly, in 500B, the STB retains all data fields with and MPEG-4 encoding format identifier in the ACL structure matching its decoding capability (MPEG-4), and discards all data fields with an MPEG-2 encoding format identifier. It should be noted that the reserved data field in this specification may include retaining and storing the information contained in the data field, and the discarding data field may include discarding and not storing the information contained in the data field.

After processing the data fields in the ACL structure of an MCP message, the STB can control the display to present the channel list as shown in FIG. 5 to the user. As an example, the channel list can include all channels, with the channels already opened highlighted by the "√" icon. It should be understood that the opened channels can also be highlighted with colors and fonts that are different from other channels, or can form a separate channel list. In addition, depending on the settings of the STB and/or the content provider, the channel list can also display more specific information (e.g., sharpness information, etc.) through a pop-up window when it is selected (e.g., double-click, etc.).

According to 500A, the channel list shows that channel 1, channel 4, channel 5 and channel 8 are opened channels, which do not include channel 3, because the encoding format of the data stream of the opened channel 3 does not match the decoding capability supported by the STB. Similarly, according to 500B, the channel list shows that channel 1, channel 3, channel 4 and channel 8 are open channels, but channel 5 may not be included, because the STB may consider that the encoding format of the data stream of opened channel 5 does not match the decoding capability supported by the STB. Alternatively or additionally, if it is hoped that the MPEG-2 encoded data stream of channel 5 can be identified by multiple STBs, the [channel 5 MPEG-4] data field can be included in the ACL structure, which includes the same information as the [channel 5 MPEG-2] data field except the encoded format identifier. Thus, in 500B, the STB supporting MPEG-4 encoding can reserve the [channel 5 MPEG-4] data field, so as to tune to the frequency point corresponding to the data stream of MPEG-2 encoding format of channel 5. Then, the decoding software built in the STB can automatically select the corresponding decoding scheme (MPEG-2 decoding) according to the identified data stream encoding format, and obtain the data stream of the channel through the edge QAM device, enabling the user to watch the channel quickly.

According to the embodiment of the present disclosure, the device and method provided by the present disclosure can support providing an accurate list of opened channels in a scenario where the channel has data streams of a plurality of encoding formats. By using the channel identifier and the encoding format identifier to jointly and uniquely identify the specific data stream of a specific channel that has been previously opened, the STB and other control devices can effectively extract the accurate information of the data stream, and retain the information of the data stream in the encoding format that matches its own decoding capability. According to the device and method described in the present disclosure, the accurate channel list information can be presented to the user by using only the reserved bits in the traditional protocol, thus increasing the convenience and flexibility of the user in channel watching, so as to obtain a greater improvement in user satisfaction and user experience at a lower cost.

The present disclosure may be implemented as any combination of devices, systems, integrated circuits, and computer programs on non-transitory computer-readable media. One or a plurality of processors may be implemented as an integrated circuit (IC), an application-specific integrated circuit (ASIC) or a large-scale integrated circuit (LSI), a system LSI, a super LSI, or an ultra LSI component that performs some or all of the functions described in the present disclosure.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or a plurality of memory units store software or algorithms via executable instructions, and one or a plurality of processors may associate a set of instructions for executing the software or algorithms.

Software and computer programs (also called programs, software applications, applications, components, or codes) include machine instructions for programmable processors, and may be realized in high-level procedural languages, object-oriented programming languages, functional programming languages, logic programming languages, assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned implementation technologies may be used to complete the implementation of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. A first device for switched digital video (SDV) systems, comprising:
    a processor; and
    a memory coupled to the processor and including executable instructions stored thereon, which, when executed by the processor, cause the first device to perform the following operations:
    generating a list of opened channels, wherein the list of opened channels includes at least one data field associated with one or more channels, each data field including a channel identifier and an encoding format identifier, wherein the channel identifier identifies a channel, and the encoding format identifier identifies the encoding format, from among a plurality of encoding formats, of a content stream for the channel identified by the channel identifier; and
    sending the list of opened channels to a second device, so that for each data field, the encoding format corresponding to the encoding format identifier of the data field is compared with the decoding capability of the second device, and the data field is retained in response to the encoding format matching the decoding capability, while the data field is removed from the generated list in response to the encoding format not matching the decoding capability; and
    periodically updating the list of opened channels according to the second device's past and current selections.

2. The first device according to claim 1, wherein the executable instructions, when executed by the processor, further cause the first device to perform the following operation:
    including the list of opened channels in an active lineup (ACL) structure in a Mini Carousel Protocol (MCP) message.

3. The first device according to claim 2, wherein the executable instructions, when executed by the processor, further cause the first device to perform the following operation:
    using reserved bits in the ACL structure in the MCP message as the encoding format identifier.

4. The first device according to claim 1, wherein the executable instructions, when executed by the processor, further cause the first device to perform the following operation:
    including frequency point information in each data field of the at least one data field, wherein the frequency point information is associated with the channel and the encoding format corresponding to the data field.

5. The first device according to claim 1, wherein:
    the one or more encoding formats include MPEG-2 encoding format and/or MPEG-4 encoding format.

6. The first device according to claim 1, wherein:
    the first device includes an SDV server, and the second device includes an STB.

7. A second device for switched digital video (SDV) systems, comprising:
    a processor; and
    a memory coupled to the processor and including executable instructions stored thereon, which, when executed by the processor, cause the second device to perform the following operations:
    receiving a list of opened channels from the first device, wherein the list of opened channels includes at least one data field associated with one or more channels, each data field including a channel identifier and an encoding format identifier, wherein the channel identifier identifies a channel, and the encoding format identifier identifies the encoding format, from among a plurality of encoding formats, of a content stream for the channel identified by the channel identifier; and
    comparing, for each data field of the at least one data field, the encoding format corresponding to the encoding format identifier of the data field with the decoding capability of the second device, and retaining the data field in response to the encoding format matching the decoding capability, while removing from the list the data field in response to the encoding format that not matching the decoding capability; and periodically updating the list of opened channels according to the second device's past and current selections.

8. The second device according to claim 7, wherein:

the list of opened channels is included in an active lineup (ACL) structure in a Mini Carousel Protocol (MCP) message; and reserved bits in the ACL structure in the MCP message are used as the encoding format identifier.

9. The second device according to claim 7, wherein: each data field of the at least one data field includes frequency point information, and the frequency point information is associated with the channel and encoding format corresponding to the data field.

10. The second device according to claim 7, wherein:

the one or more encoding formats include MPEG-2 encoding format and/or MPEG-4 encoding format.

11. The second device according to claim 7, wherein:

the first device includes an SDV server, and the second device includes an STB.

12. A method for a first device in a switched digital video (SDV) system, comprising:

generating a list of opened channels, wherein the list of opened channels includes at least one data field associated with one or more channels, each data field including a channel identifier and an encoding format identifier, wherein the channel identifier identifies a channel, and the encoding format identifier identifies the encoding format, from among a plurality of encoding formats, of a content stream for the channel identified by the channel identifier; and sending the list of opened channels to a second device, so that for each data field, the encoding format corresponding to the encoding format identifier of the data field is compared with the decoding capability of the second device, and the data field is retained in response to the encoding format matching the decoding capability, while the data field is removed from the generated list in response to the encoding format not matching the decoding capability; and periodically updating the list of opened channels according to the second device's past and current selections.

13. The method according to claim 12, further comprising:

including the list of opened channels in an active lineup (ACL) structure in a Mini Carousel Protocol (MCP) message.

14. The method according to claim 13, further comprising:

using reserved bits in the ACL structure in the MCP message as the encoding format identifier.

15. The method according to claim 12, further comprising:

including frequency point information in each data field of the at least one data field, wherein the frequency point information is associated with the channel and the encoding format corresponding to the data field.

16. The method according to claim 12, wherein:

the one or more encoding formats include MPEG-2 encoding format and/or MPEG-4 encoding format.

17. The method according to claim 12, wherein:

the first device includes an SDV server, and the second device includes an STB.

\* \* \* \* \*